United States Patent
Sasaki et al.

(10) Patent No.: US 11,117,595 B2
(45) Date of Patent: Sep. 14, 2021

(54) DISPLAY DEVICE FOR A VEHICLE

(71) Applicant: Toyota Jidosha Kabushiki Kaisha, Toyota (JP)

(72) Inventors: Akira Sasaki, Miyoshi (JP); Eisuke Ando, Nagoya (JP); Misako Hayashima, Okazaki (JP); Saki Kitoh, Okazaki (JP); Masahiro Yamashita, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/247,967

(22) Filed: Jan. 15, 2019

(65) Prior Publication Data
US 2019/0217872 A1     Jul. 18, 2019

(30) Foreign Application Priority Data
Jan. 17, 2018   (JP) .............................. JP2018-005819

(51) Int. Cl.
*B60W 50/14*   (2020.01)
*G02B 27/01*   (2006.01)
(Continued)

(52) U.S. Cl.
CPC ............. *B60W 50/14* (2013.01); *B60K 35/00* (2013.01); *G02B 27/01* (2013.01); *G06K 9/00818* (2013.01); *B60W 2050/143* (2013.01); *B60W 2050/146* (2013.01); *B60W 2540/043* (2020.02); *G02B 2027/014* (2013.01); *G02B 2027/0138* (2013.01)

(58) Field of Classification Search
CPC .......... B60W 50/14; B60W 2050/143; B60W 2050/146; B60W 2540/28; B60K 35/00; G02B 27/01; G02B 2027/0138; G02B 2027/014; G06K 9/00818
USPC ...................................................... 340/425.5
See application file for complete search history.

(56) References Cited

U.S. PATENT DOCUMENTS 9,758,116 B2 * 9/2017 Xiong ................... B60R 16/037
2001/0032070 A1 * 10/2001 Teicher ................ G06K 9/2054
704/2

(Continued)

FOREIGN PATENT DOCUMENTS

EP   1273887 A2   1/2003
EP   1359557 A1   11/2003
(Continued)

*Primary Examiner* — Quan-Zhen Wang
*Assistant Examiner* — Mancil Littlejohn, Jr.
(74) *Attorney, Agent, or Firm* — Dinsmore & Shohl LLP (57) ABSTRACT

A display device for a vehicle is provided, the device including personal information acquisition section, environment information acquisition section, information conversion section and display section. The personal information acquisition section acquires personal information about a driver of the vehicle from an identification tag in which the personal information of the driver is recorded. The environment information acquisition section acquires environment information about a vicinity of the vehicle. The information conversion section converts the environment information in accordance with the personal information of the driver. The display section displays the converted information to the interior of a passenger compartment of the vehicle.

14 Claims, 6 Drawing Sheets

(51) Int. Cl.
*B60K 35/00* (2006.01)
*G06K 9/00* (2006.01)

(56) References Cited

U.S. PATENT DOCUMENTS

| | | | | |
|---|---|---|---|---|
| 2008/0051946 | A1* | 2/2008 | Breed | G02B 27/01 |
| | | | | 701/1 |
| 2012/0215403 | A1* | 8/2012 | Tengler | B60K 37/06 |
| | | | | 701/36 |
| 2015/0370785 | A1* | 12/2015 | Mauser | G06K 9/00671 |
| | | | | 704/7 |
| 2016/0103690 | A1* | 4/2016 | Kim | G06K 7/1447 |
| | | | | 704/8 |
| 2016/0350286 | A1* | 12/2016 | Murthy | G08G 1/09623 |

FOREIGN PATENT DOCUMENTS

| | | | |
|---|---|---|---|
| GB | 2541519 | A | 2/2017 |
| JP | 2004-139510 | A | 5/2004 |
| JP | 2008280026 | A * | 1/2008 |
| JP | 2008280026 | A * | 11/2008 |
| JP | 2009109404 | A | 5/2009 |
| JP | 2011-207397 | A | 10/2011 |
| JP | 2016095688 | A | 5/2016 |
| NO | 2016060907 | A1 | 4/2016 |

* cited by examiner

DISPLAY DEVICE FOR A VEHICLE

CROSS-REFERENCE TO RELATED APPLICATION

This application is based on and claims priority under 35 USC 119 from Japanese Patent Application No. 20184005819 filed on Jan. 17, 2018, the disclosure of which is incorporated by, reference herein.

BACKGROUND

Technical Field

The present disclosure relates to a display device for a vehicle.

Related Art

Japanese Patent Application Laid-Open (JP-A) No. 2009-109404 recites a road sign display device installed in a vehicle. According to this road sign display device, a road sign is imaged by a camera, the meaning of the road sign is interpreted, and a corresponding road sign from a driver's home country is displayed at a display device.

In the road sign display device according to JP-A No. 2009-109404, the mother tongue of the driver is determined on the basis of data entered in advance by the driver. However, if the driver makes a mistake when entering their mother tongue, road signs may not be correctly interpreted and information that the driver cannot understand may be displayed at the display device.

SUMMARY

The present disclosure provides a display device for a vehicle that may display information that is comprehensible for a driver.

A display device for a vehicle according to a first aspect of the present disclosure includes (i) a personal information acquisition section that acquires personal information of a driver of the vehicle from a first identification tag at which the personal information of the driver is recorded, (ii) an environment information acquisition section that acquires environment information about a vicinity of the vehicle, (iii) an information conversion section that converts the environment information in accordance with the personal information of the drive, and (iv) a display section that displays the converted environment information to the interior of a passenger compartment of the vehicle.

According to the first aspect of the display device for a vehicle, environment information about the vicinity of the vehicle that is acquired by the environment information acquisition section is converted by the information conversion section. The information conversion section converts the environment information on the basis of the personal information of the driver acquired from a first identification tag at which the personal information of the driver is recorded. Therefore, erroneous personal information of the driver is less likely to be acquired than in a case in which, for example, a driver manually enters their personal information. Hence, information that is comprehensible for the driver may be displayed at the display section. The meaning of the term "environment information" as used herein is intended to include information about the outside of the vehicle, including information relating to objects that can be seen by occupants in the vehicle, traffic information that cannot be seen by occupants in the vehicle, and so forth. The meaning of the term "personal information of the driver" as used herein is intended to include information that includes at least the nationality of the driver.

In a display device for a vehicle according to a second aspect, in the display device for a vehicle of the first aspect, the environment information acquisition section includes an imaging device that acquires the environment information including a road sign, and the information conversion section converts the road sign to text information that is comprehensible for the driver.

According to the second aspect of the display device for a vehicle, a road sign acquired by the imaging device is converted by the information conversion section to text information that can be understood by the driven. As a result, even when the driver cannot directly understand the meaning expressed by the design of a road sign, the driver may understand the meaning through text information. Therefore, the driver may understand road signs even when, for example, driving a vehicle in a country with different road signs from the driver's country of residence.

In a display device for a vehicle according to a third aspect, in the display device for a vehicle of the first aspect or the second aspect, the environment information acquisition section includes a communications device, the communications device acquires the environment information including traffic information, and the information conversion section converts the traffic information to text information.

According to the third aspect of the display device for a vehicle, the traffic information acquired by the communications device is converted by the information conversion section to text information that can be understood by the driver. As a result, even when the driver cannot directly understand the traffic information acquired by the communications device, the driver may understand the details thereof through the text information. Therefore, the driver may understand traffic information even when, for example, driving a vehicle in a country with a different language from the driver's country of residence.

In a display device for a vehicle according to a fourth aspect, in the display device for a vehicle of the third aspect, the communications device can transmit the traffic information to another vehicle.

According to the fourth aspect of the display device for a vehicle, because the communications device can transmit traffic information to other vehicles, traffic information may be transferred between vehicles. Therefore, for example, when an accident occurs in a vicinity of a vehicle, accident information may be transmitted to a following vehicle. The following vehicle may then transmit the accident information to a vehicle further behind. Thus, the communications device may obtain emergency information more rapidly than in a situation in which, for example, accident information is acquired only from the internet.

In a display device for a vehicle according to a fifth aspect, in the display device for a vehicle of the first aspect, the information conversion section converts the environment information to image information.

According to the fifth aspect of the display device for a vehicle, the environment information is converted to image information by the information conversion section. For example, environment information that is a road sign is converted to image information that can be understood by the driver. Therefore, even when the driver cannot directly understand the meaning expressed by the design of a road sign, the driver may understand the meaning through image information.

Alternatively, for example, environment information that is a scene that is offensive to the driver can be converted by the information conversion section to image information that is not offensive to the driver. Therefore, stress may be moderated for a driver driving a vehicle in a country with different cultural norms.

In a display device for a vehicle according to a sixth aspect, in the display device for a vehicle of any one of the first to fifth aspects, when a vehicle occupant other than the driver is in the vehicle, (i) the personal information acquisition section acquires personal information of the vehicle occupant from a second identification tag at which the personal information of the vehicle occupant is recorded, (ii) the information conversion section converts the environment information in accordance with the personal information of the vehicle occupant, and (iii) the display section displays the information converted in accordance with the personal information of the vehicle occupant to the interior of the passenger compartment of the vehicle.

According to the sixth aspect of the display device for a vehicle, in addition to information converted on the basis of the personal information of the driver, information converted on the basis of the personal information of a vehicle occupant other than the driver is displayed at the display device. Therefore, environment information acquired by the environment information acquisition section may be understood by vehicle occupants other than the driver.

In a display device for a vehicle according to a seventh aspect, in the display device for a vehicle of any one of the first to sixth aspect, the display device displays supplementary information relating to the environment information in accordance with the personal information of the driver.

According to the seventh aspect of the display device for a vehicle, in addition to information converted on the basis of the personal information of the driver, supplementary information relating to the environment information is displayed at the display device. Therefore, the driver may obtain additional knowledge about the environment information.

According to the display device for a vehicle according to the present disclosure, information that is comprehensible for a driver may be displayed.

BRIEF DESCRIPTION OF THE DRAWINGS

Exemplary embodiments of the present disclosure will be described in detail based on the following figures, wherein.

DETAILED DESCRIPTION

Display Device for a Vehicle

A vehicle display device 20 according to an exemplary embodiment of the present disclosure is a driver assistance system for assisting driving when a driver P (see FIG. 2) is driving a vehicle in a country other than the driver's country of residence. The vehicle display device 20 displays, for example, images for alleviating problems in driving that are caused by differences in traffic regulations and the like, to the interior of a passenger compartment.

Figure 1:
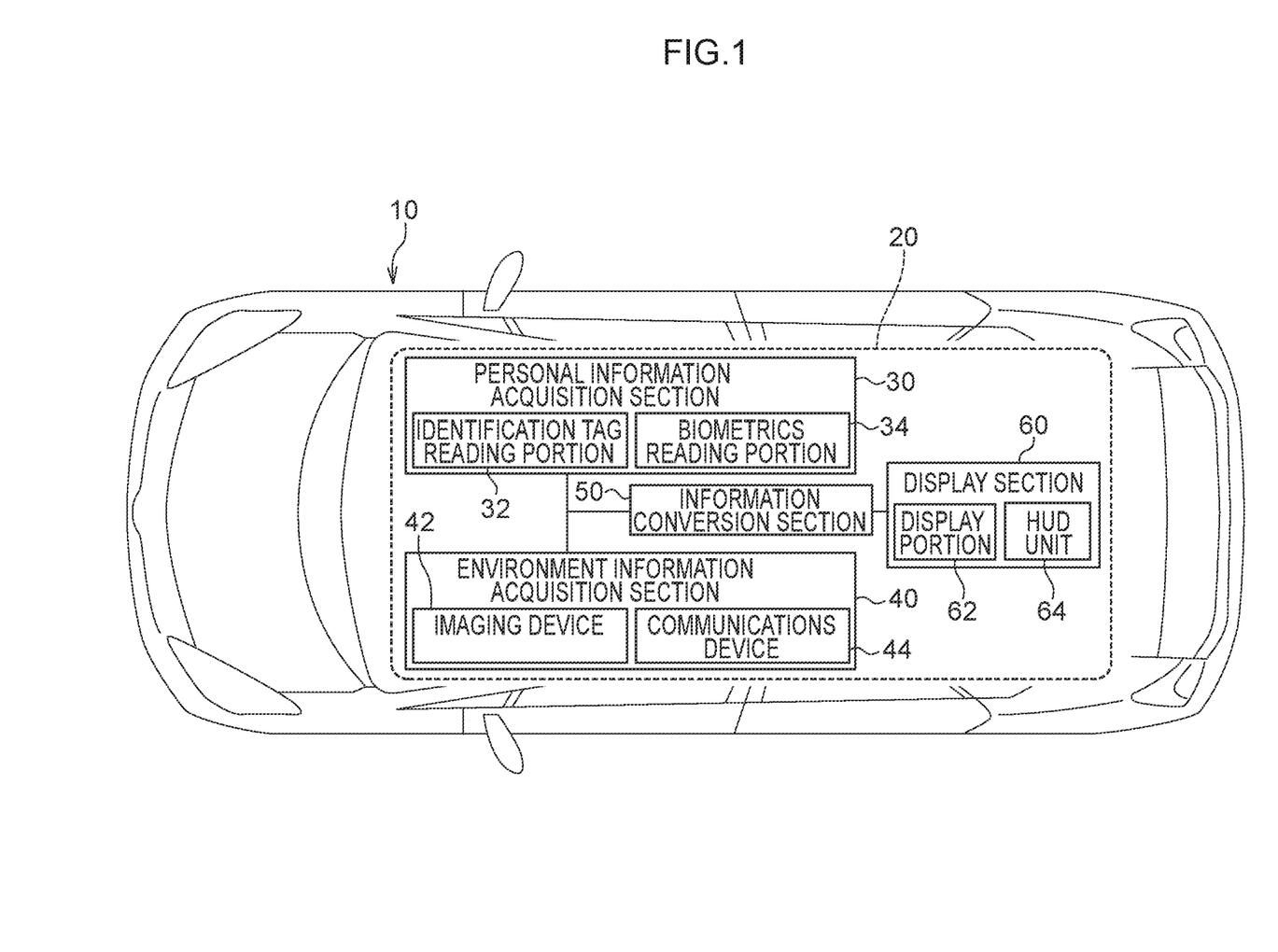
FIG. 1 is a conceptual diagram showing schematics of a vehicle in which a display device for a vehicle according to an exemplary embodiment of the present disclosure is installed.

As shown in FIG. 1, the vehicle display device 20 is installed in a vehicle 10. The vehicle display device 20 is provided with a personal information acquisition section 30, an environment information acquisition section 40, an information conversion section 50 and a display section 60.

Figure 6:
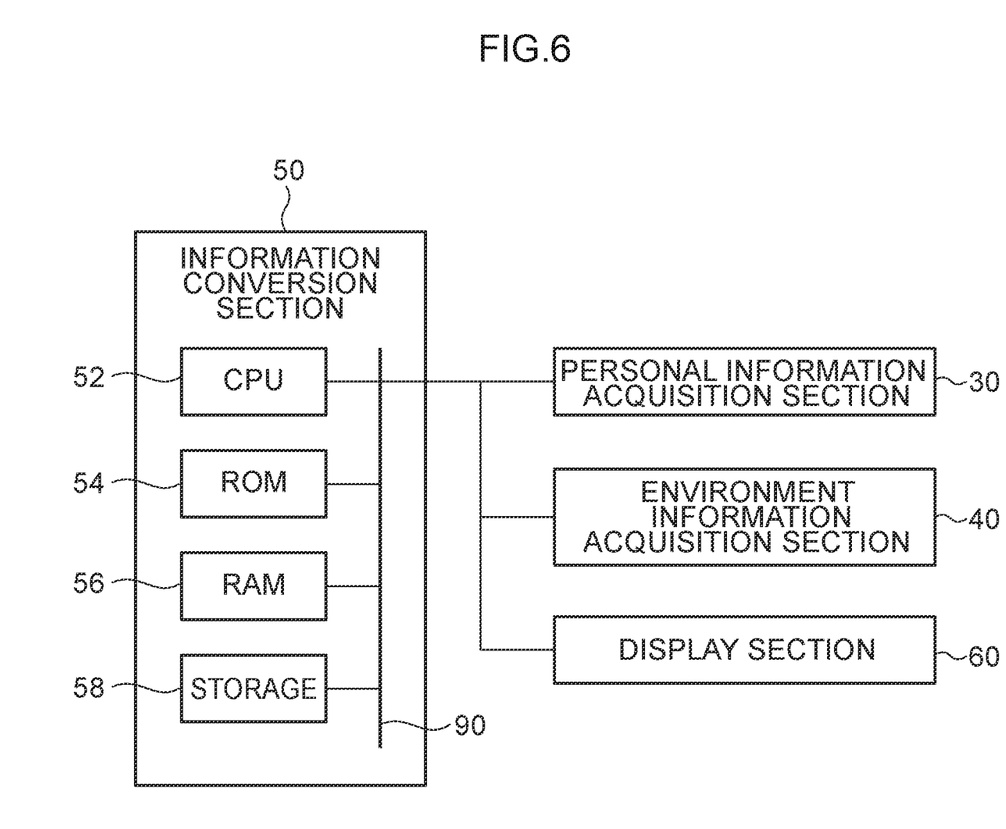
FIG. 6 is a block diagram illustrating hardware configuration of the display device for a vehicle.

As shown in FIG. 6, the information conversion section 50 includes a Central Processing Unit (CPU) 52, Read Only Memory (ROM) 54, Random Access Memory (RAM) 56, and storage 58. These configurations of the information conversion section 50 are connected to the personal information acquisition section 30, the environment information acquisition section 40, and the display section 60 so as to be capable of communicating each other through a bus 90.

The CPU 52 is a central computation processing unit that executes various programs and controls various sections. Namely, the CPU 52 reads programs from the ROM 34 or the storage 58, and executes the programs using the RAM 56 as a workspace. The CPU 52 controls the various configurations and performs various computation processing according to the programs recorded in the ROM 54 or the storage 58. In the present exemplary embodiment, the ROM 54 or the storage 58 stores (i) an information acquisition program to acquire an information by the personal information acquisition section 30 and the environment information acquisition section 40, (ii) an information conversion program to convert the information which is acquired by the personal information acquisition section 30 and the environment information acquisition section 40, and (iii) an information display program to display the converted information to the display section 60.

The RUM 54 stores various programs and various data. The RAM 56 serves as a workspace that temporarily retains programs and data. The storage 58 is configured by a Hard Disk Drive (HDD) or a Solid State Drive (SSD), and stores various programs, including an operating system, and various data.

At executing aforementioned various programs, the vehicle display device 20 performs various functions using the aforementioned hardware resources. Each function performed by the vehicle display device 20 is explained below.

Personal Information Acquisition Section

The personal information acquisition section 30 is an information acquisition device for acquiring personal information of vehicle occupants. Processing of the personal information acquisition section 30 is implemented by the CPU 52 that reads and executes the information acquisition program retained in the ROM 54 or the storage 58. The personal information acquisition section 30 transfers acquired personal information of a vehicle occupant to the information conversion section 50 or display section 60 by electronic signals. The personal information acquisition section 30 is provided with an identification tag reading portion 32 and a biometrics reading portion 34.

The meaning of the term "identification tag" as used herein is intended to include an identity document on which at least a nationality is recorded as personal information. To be specific, a passport, international driving license or the like in which a chip that records the nationality is embedded corresponds to an identification tag. Preferable personal information recorded at the identification tag includes, in addition to the nationality, a country of residence, date of birth, sex, religion, usual language, occupation and the like.

Figure 2:
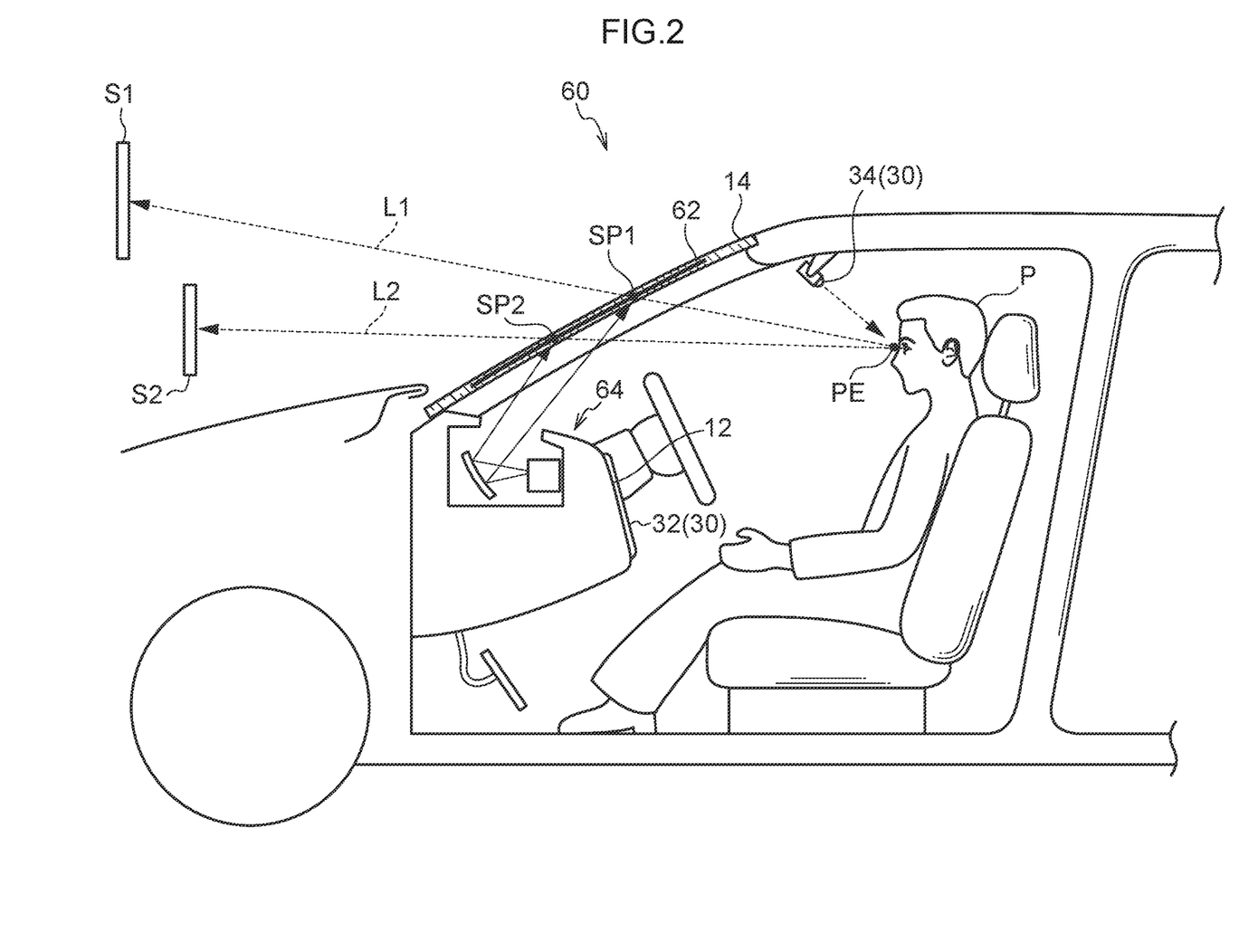
FIG. 2 is a side view showing an example of positions at which information converted on the basis of personal information of a driver is displayed by the display device for a vehicle according to the exemplary embodiment of the present disclosure.

As shown in FIG. 2, the identification tag reading portion 32 is a detection device disposed at an instrument panel 12 of the vehicle 10. When a vehicle occupant of the vehicle 10 brings an identification tag close to the identification tag reading portion 32, the identification, tag reading portion 32 reads personal information of the vehicle occupant from, for example, a chip embedded in the identification tag. Among vehicle occupants, the identification tag reading portion 32 acquires personal information of at least the driver P. The meaning of the term "driver" as used herein is intended to include a vehicle occupant sitting on a driver seat. The term "driver seat" is intended to include, in a vehicle equipped with autonomous driving functions, a seat on which a vehicle occupant who conducts driving during manual driving sits. The identification tag reading portion 32 transfers the acquired personal information to the information conversion section 50.

The biometrics reading portion 34 is a detection device that detects a position of the eyes of a vehicle occupant. For example, as shown in FIG. 2, the biometrics reading portion 34 detects a position PP of the eyes of the driver P. Hence, the biometrics reading portion 34 detects positions SP1 and SP2 at which straight lines L1 and L2 that link the position PE of the eyes with signs S1 and S2 outside the vehicle 10 intersect with a display portion 62 (which is described in detail below) at a front window 14.

Information of the detected positions SP1 and SP2 are transferred to a head-up display (HUD) unit 64 (described in detail below). The positions of the signs S1 and S2 relative to the vehicle 10 are detected by an imaging device 42, which is described below, and the information of the detected positions are transferred to the biometrics reading portion 34. In FIG. 2, the biometrics reading portion 34 is disposed at the vehicle 10, but the biometrics reading portion 34 may, for example, be formed as a wearable terminal and disposed at the head of the driver P.

Environment Information Acquisition Section

The environment information acquisition section 40 shown in FIG. 1 is an information acquisition device for obtaining environment information. Processing of environment information acquisition section 40 is implemented by the CPU 52 that reads and executes the information acquisition program retained in the ROM 54 or the storage 58. The environment information acquisition section 40 transfers acquired environment information to the information conversion section 50 or the above-described biometrics reading portion 34 by electronic signals. The environment information acquisition section 40 is provided with the imaging device 42 and a communications device 44.

The meaning of the term "environment information" as used herein is intended to include information about the outside of the vehicle 10. To be specific, "environment information" encompasses: information relating to traffic regulations such as signs, road markings and so forth; information relating to established structures on the ground such as building names, bridge names, station names and so forth; information relating to mountains, rivers and the like; information relating to objects that can be seen by vehicle occupants of the vehicle 10; traffic accident information, congestion information and so forth; traffic information that cannot be seen by vehicle occupants of the vehicle 10; and the like.

The imaging device 42 is a camera that images a space outside the vehicle 10. In some embodiments, the imaging device 42 images a range that the driver P illustrated in FIG. 2 can see through the front window 14. The imaging device 42 may be equipped with a range detector and may detect distances between the vehicle 10 and signs in the vicinity of the vehicle 10, gradients, vehicle-to-vehicle distances from preceding vehicles, and the like.

The communications device 44 may be equipped with a GPS receiver and detect location information of the vehicle 10. The communications device 44 may access a database on an internet and receive information on signs, road markings, building names, bridge names, station names and so forth in the vicinity of the vehicle 10, and map information and the like (collectively referred to below as "signs and the like"). The communications device 44 may also receive traffic information such as traffic accident information, congestion information and the like from a database on the internet.

Figure 4:
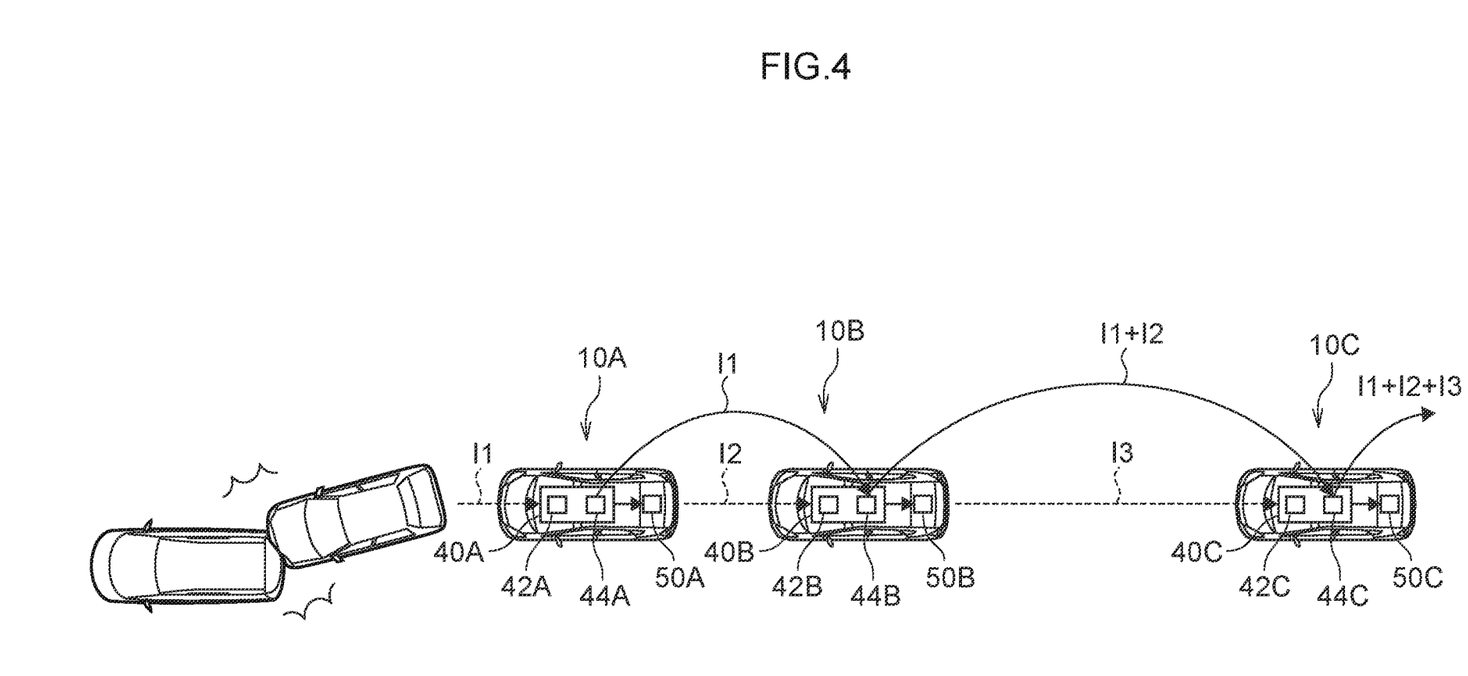
FIG. 4 is a conceptual diagram showing a state in which traffic information is transmitted between vehicles in which the display device for a vehicle according to the exemplary embodiment of the present disclosure is installed.

The communications device 44 may communicate with vehicles in the vicinity of the vehicle 10. For example, as shown in FIG. 4, when a collision accident occurs in the vicinity of a vehicle 10A, an imaging device 42A of an environment information acquisition section 40A installed in the vehicle 10A acquires accident information (information I1) to be used as traffic information. The information I1 is transmitted by a communications device 44A to a following vehicle 10B.

In the vehicle 10B, the information I1 transmitted from the communications device 44A is received by a communications device 44B of an environment information acquisition section 40B. An imaging device 42B detects a vehicle-to-vehicle distance from the vehicle 10A (information I2). The information I1 and information I2 are transmitted to a following vehicle 10C by the communications device 44B.

In the vehicle 10C, the information I1 and information I2 transmitted from the communications device 44B are received by a communications device 44C of an environment information acquisition section 40C. An imaging device 42C detects a vehicle-to-vehicle distance from the vehicle 108 (information I3). The information I1, information I2 and information I3 are transmitted to a following vehicle, which is not shown in FIG. 4, by the communications device 44C.

Thus, the communications device 44 may communicate with vehicles in the vicinity of the vehicle 10. Therefore, when an accident occurs near the vehicle 10, the driver P of the vehicle 10 may obtain accident information more quickly than in a situation in which the accident information is acquired after being uploaded to the internet.

In addition to accident information (the information I1), the communications device 44 sends vehicle-to-vehicle distances from preceding vehicles (information I2, I3, etc.) to following vehicles. Therefore, the driver P may identify from information converted by the information conversion section 50, which is described below, the presence of congestion caused by an accident, the possibility of congestion occurring, and the like.

Information Conversion Section

The information conversion section 50 is an information processing device that converts environment information acquired by the environment information acquisition section 40 to "information that is comprehensible" for at least the driver P among the vehicle occupants or "information that is not offensive". Processing of information conversion section 50 is implemented by the CPU 52 that reads and executes the information conversion program retained in the ROM 54 or the storage 58.

Figure 3A:
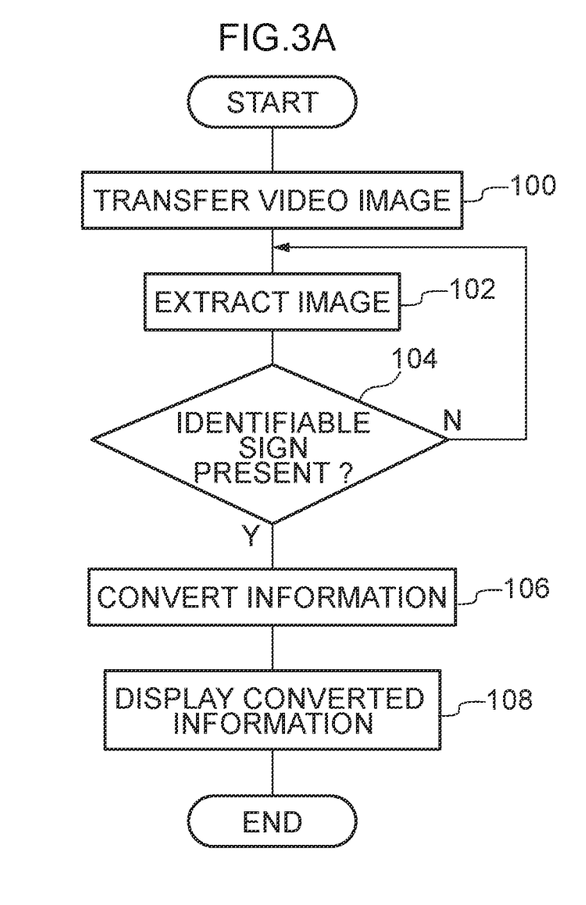
FIG. 3A is a flowchart showing a procedure for an information conversion section of the display device for a vehicle according to the exemplary embodiment of the present disclosure to convert information transferred from an environment information acquisition section.

An example of an information processing method of the CPU 52 is described using the flowchart in FIG. 3A. FIG. 3A shows a procedure that converts environment information acquired by the imaging device 42 of the environment information acquisition section 40 to information that is comprehensible for the driver P.

First, a video image imaged by the imaging device 42 is transferred from the imaging device 42 to the information conversion section 50 by the CPU 52 that reads and executes the information acquisition program (step 100). This video image is transferred sequentially and continuously.

The CPU 52 extracts an image for each set of a predetermined number of frames from the video image (step 102). The information conversion section 50 inspects whether or not an identifiable sign is contained in this image (step 104). This inspection of the image is a determination as to whether or not sign information can be detected in a portion of the image. Sign information is memorized in advance in the ROM 54 or the storage 58 of the information conversion section 50.

Figure 3B:
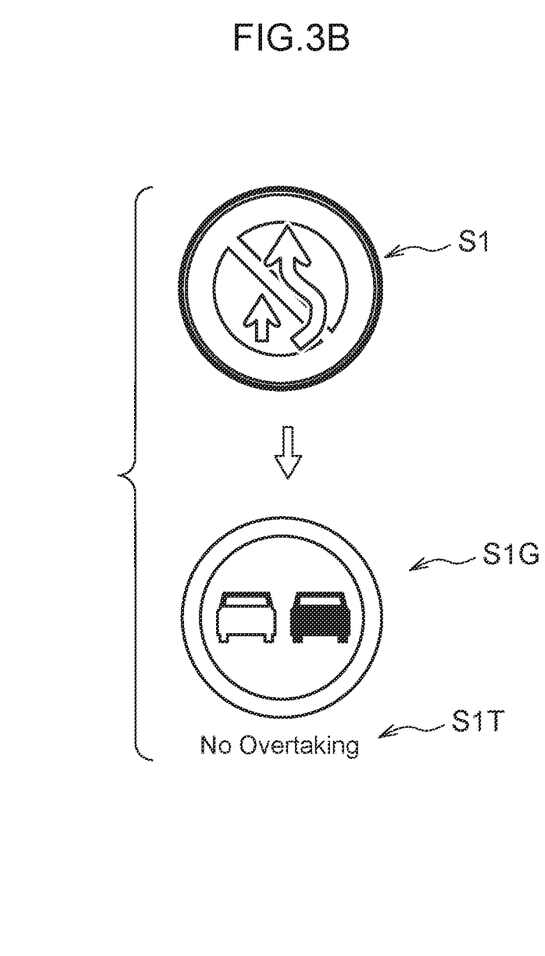
FIG. 3B is a conceptual diagram showing an example of information acquired by the environment information acquisition section and converted information converted by the information conversion section of the display device for a vehicle according to the exemplary embodiment of the present disclosure.

If an identifiable sign is contained in the image, then on the basis of the personal information of the driver P acquired by the personal information acquisition section 30, the CPU 52 reads and executes the information conversion program, and converts the sign to information that is comprehensible for the driver P (step 106). As a specific example, as shown in FIG. 3B, a sign S1 that expresses the meaning "overtaking forbidden" is converted, such that a British driver P can understand the sign S1, to a sign S1G that expresses the meaning "overtaking forbidden" in Britain and to (mother tongue) text information S1T that expresses the meaning "overtaking forbidden" in Britain. The converted information (the sign S1G and text information S1T) is displayed by the display section 60, which is described below (step 108).

On the other hand, in step 104, if no identifiable sign is contained in the image extracted from the video image imaged by the imaging device 42, the information conversion section 50 returns to step 102. Hence, images of subsequent frames are extracted and inspected for whether or not an identifiable sign is contained in the images.

In step 104 in the present exemplary embodiment, whether or not sign information can be detected in an image extracted from the video image imaged by the imaging device 42 is inspected for on the basis of sign information memorized in the ROM 54 or the storage 58 of the information conversion section 50. However, embodiments of the present disclosure are not limited thus. For example, sign information may be detected in an image on the basis of sign information for the vicinity of the vehicle 10 that is acquired from a database on the internet by the communications device 44 by the CPU 52 that reads and executes the information acquisition program. Accordingly, oven when image resolution is low, sign information may be detected and converted information may be displayed promptly.

A different example of an information processing method of the CPU 52 is described. For example, the information conversion section 50 may convert information other than sign information that is acquired by the imaging device 42 of the environment information acquisition section 40 to information that is comprehensible for the driver P, by the CPU 52 that reads and executes the information conversion program. As a specific example, when a historical building appears in the video image, a building name of the building is converted to the mother tongue of the driver P. Alternatively, when a tourism site appears in the video image, a place name of the tourism site is converted to the mother tongue of the driver P.

Further, information other than sign information, acquired by the imaging device 42 of the environment information acquisition section 40, may be converted to information that is not offensive to the driver P, by the CPU 52 that reads and executes the information conversion program. As a specific example, if the driver P follows a religion that considers cows sacred, then when a restaurant, meat processing plant or the like that supplies beef appears in the video image, the restaurant, meat processing plant or the like may be converted to a mosaic image.

Furthermore, traffic information acquired by the communications device 44 of the environment information acquisition section 40 may be converted to information that is comprehensible for the driver P, by the CPU 52 that reads and executes the information conversion program. As a specific example, when the communications device 44 acquires accident information from between the current location of the vehicle 10 and a destination of the vehicle 10, this information is converted to (text information in) the mother tongue of the driver P.

When traffic information is transmitted from a preceding vehicle, a determination of the presence or possibility of congestion can be made from accumulated vehicle distances (information I2, I3, etc.) transmitted between vehicles in front, by the CPU 52 that reads and executes the information conversion program. The CPU 52 converts the result of this determination to text information. Thus, the CPU 52 may convert information estimated from obtained information to text information.

As in the examples described above, environment information acquired by the environment information acquisition section 40 can be converted to one or both of image information and text information by the CPU 52. In the following descriptions, environment information that has been converted by the CPU 52 is referred to as "converted information".

Display Section

The display section 60 is a display device for displaying converted information to the interior of the passenger compartment of the vehicle 10. Processing of display section 60 is implemented by the CPU 52 that reads and executes the information display program retained in the ROM 54 or the storage 58. As shown in FIG. 2, the display section 60 is provided with the display portion 62 and the HUD unit 64. The display portion 62 is a head-up display formed at the front window 14 of the vehicle 10. The display portion 62 is formed over substantially the whole area of the front window 14.

The HUD unit 64 is provided below the front window 14 in order to display one or both of image information and text information at the display portion 62. The HUD unit 64 projects converted information transferred from the information conversion section 50 onto the display portion 62.

Figure 5A:
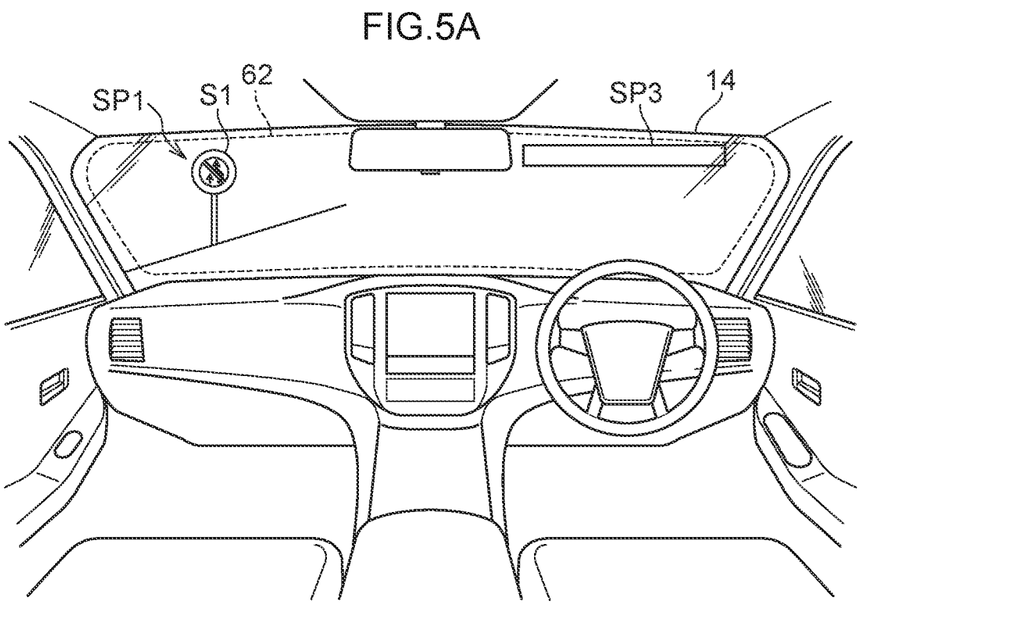
FIG. 5A is a perspective view showing a sign that is environment information that can be seen by a driver in the vehicle in which the display device for a vehicle according to the exemplary embodiment of the present disclosure is installed.
Figure 5B:
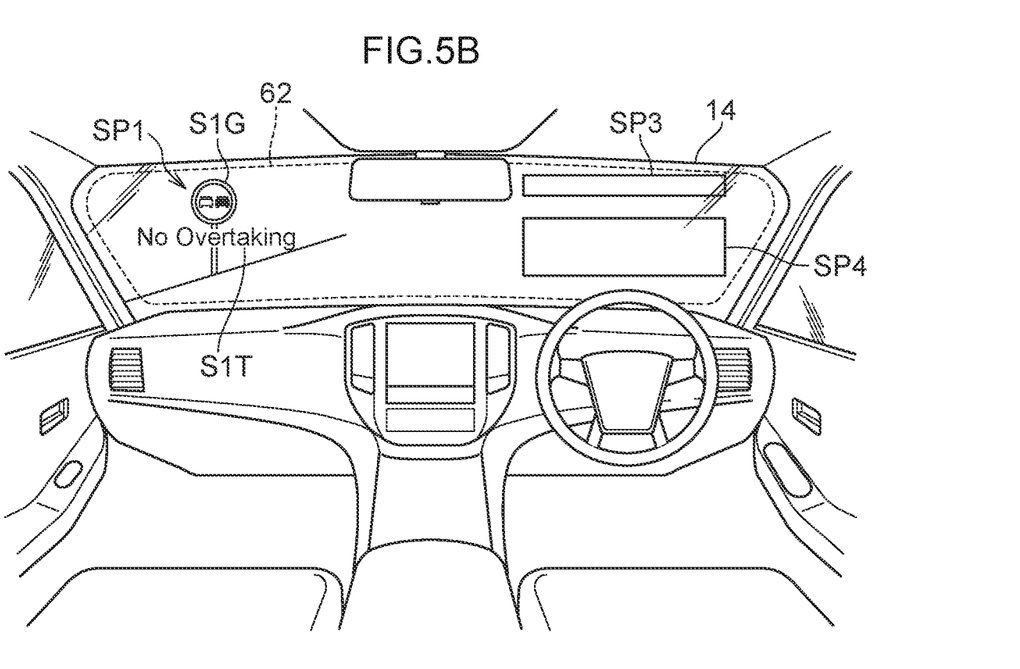
FIG. 5B is a perspective view showing a state in which converted information is displayed at a location of a display portion that overlaps with the sign.

For example, a sign S1 that is environment information as illustrated in FIG. 5A acquired by the imaging device 42 (see FIG. 1) is converted to information that is comprehensible for the driver P (the sign S1G and text information S1T), by the CPU 52 that reads and executes the information conversion program, as illustrated in FIG. 3B. As shown in FIG. 2, this converted information is displayed by the HUD unit 64 at the position SP1 of the display portion 62 that is detected by the biometrics reading portion 34. Thus, as illustrated in FIG. 5B, the driver P may see the converted information, which is displayed overlapping with a position at which the sign S1 is located as seen by the driver P.

Traffic information such as accident information (the information I1) or the like acquired by the communications device 44 is displayed at a predetermined location of the display portion 62 regardless of the position of the eyes of the driver P. For example, the traffic information is displayed at a location that is unlikely to impede driving such as an uppermost portion or the like of the display portion 62, such as position SP3 shown in FIG. 5A and FIG. 5B.

A sign or the like and converted information in which the sign or the like has been converted to information that is comprehensible for the driver P may be displayed at position SP3. For example, the sign S1, the sign S1G and the text information S1T may be depicted together at position SP3. Thus, the driver P may understand the meaning of the sign S1 that can be seen outside the front window 14. If there are plural signs in the vicinity of the vehicle 10, the signs may be displayed in a list with the closest sign at the top of the list. Thus, the driver P may easily understand the meanings of the signs. In these cases, the sign S1G and text information S1T need not be displayed at position SP1.

When, the driver P must brake immediately or the like, for example, an accident occurs just in front of the vehicle 10 or a person or animal runs out in front of the vehicle 10, information is displayed at a highly visible position in front of the driver P or the like, such as position SP4. Highly urgent emergency information may be displayed by the vehicle display device 20 in this manner. When emergency information is displayed, an alert noise is sounded to attract the attention of the driver P, in some embodiments.

When an animal runs out into the road, if this animal is considered more important in the country in which the vehicle 10 is running than in the country of residence of the driver, this fact may be displayed at the display portion 62 as supplementary information. As a specific example, if the vehicle 10 is driving in a country in which many of the residents follow a religion that considers cows sacred, then when a cow runs out into the road, the fact that the cow is considered sacred may be displayed at, for example, position SP3. Alternatively, this fact may be displayed at a location of the display portion 62 overlapping the cow. Hence, the driver may drive taking particular care not to collide with the cow.

This "supplementary information" is not information in which a sign, animal or the like is converted directly to an image, text or the like that is comprehensible for the driver P. Supplementary information is information that is considered preferable for driving according to differences between the country of residence of the driver P and the country in which the vehicle 10 is running. The supplementary information is, for example, stored in advance in the information conversion section 50. Note that functions for displaying emergency information and supplementary information are not required functions in the present disclosure and may be omitted as appropriate.

Operations

As described above, according to the vehicle display device 20 according to the present exemplary embodiment, when a driver P is driving the vehicle 10 in a country (a foreign country) other than their home country (the country of their nationality), signs of the foreign country may be converted to signs of the driver P's home country and displayed. As a result, the safety risks of driving in a foreign country may be moderated.

The vehicle display device 20 may also convert and display building names of historical buildings, place names of tourism sites and the like in the driver P's mother tongue. Therefore, if the driver P is a tourist, the driver P may easily obtain information about approaching locations. Accordingly, an embodiment in which the place names of tourism sites are displayed can be excellently employed when, for example, the vehicle 10 is under autonomous driving control. Because tourism information is displayed in this manner when the vehicle 10 is under autonomous driving control, a tourist may make efficient use of their travel time.

Further, the vehicle display device 20 may convert and display scenes that may be offensive to the driver P to images that are not offensive to the driver P (for example, mosaic images). Therefore, offence that is experienced due to cultural differences between the home country of the driver P and the country in which the vehicle 10 is driving may be moderated.

In the vehicle display device 20 according to the present exemplary embodiment, the identification tag reading portion 32 acquires personal information of the driver P from an identification tag carried by the driver P. Therefore, more accurate personal information may be obtained than if, for example, the driver P manually enters their personal information themself. Furthermore, if the driver is replaced, the details of displays at the display portion 62 may be altered simply by an identification tag of the replacement driver being read by the identification tag reading portion 32.

In the present exemplary embodiment, as shown in FIG. 3B, the sign S1 is converted to and displayed as the sign S1G and the text information S1T. However, embodiments of the present disclosure are not limited thus. For example, if the meanings expressed by the sign S1 and the sign S1G completely match or the like, the text information S1T need not necessarily be displayed and it is sufficient to display only the sign S1G. Alternatively, if a sign corresponding to the sign S1 does not exist in the country of residence of the driver P, it is sufficient to display only the text information S1T.

in the present exemplary embodiment, an example is described in which the personal information of the driver P is acquired by the identification tag reading portion 32 and converted information is displayed at locations of the display portion 62 at which signs and the like are disposed as seen by the driver P. However, embodiments of the present disclosure are not limited thus.

For example, personal information of a vehicle occupant other than the driver P may be acquired by the identification tag reading portion 32, in which case converted information may be displayed at locations at which signs and the like are disposed as seen by the vehicle occupant. Alternatively, the display portion 62 may be divided in two in the vehicle width direction, converted information may be displayed at locations of the display portion 62 at the driver seat side at which signs and the like are disposed as seen by the driver P, and converted information may be displayed at locations of the display portion 62 at a front passenger seat side at which signs and the like are disposed as seen by a vehicle occupant sitting on the front passenger seat.

In the present exemplary embodiment, the display portion 62 is formed only at the front window 14, but embodiments of the present disclosure are not limited thus. For example, the display portion 62 may be formed at a side window. Accordingly, the amount of information that can be obtained may be increased.

In the present exemplary embodiment, the environment information acquisition section 40 is equipped with the communications device 44 that is capable of communicating with the Internet and with other vehicles, but embodiments of the present disclosure are not limited thus. For example, functions enabling communication with other vehicles need not necessarily be provided. Even, if there is no communication with other vehicles, traffic information may be obtained from a database on the interne.

Further, the communications device 44 may be omitted from the environment information acquisition section 40. Even if the communications device 44 is not provided, the environment information acquisition section 40 may acquire environment information about the vicinity of the vehicle 10 with the imaging device 42, in a configuration in which the communications device 44 is not provided, the structure of the vehicle display device 20 may be simplified.

In the above exemplary embodiment, the information acquisition processing, the information conversion processing, and the information display processing are executed by the CPU 52 that reads software (i.e., programs). However, note that the aforementioned processing may be executed by various processors other than the CPU 52. Examples of such processors include a Programmable Logic Device (PLD) in which circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). The information acquisition processing, the information conversion processing, and the information display processing may be executed by a single one of such processors, or may be executed by a combination of two or more processors of the same type or different types (for example, by plural FPGAs, or a combination of a CPU 52 and an FPGA). Specifically, examples of hardware structures of such processors are electric circuits configured by combining circuit elements such as semiconductor devices.

In the above exemplary embodiment, explanation has been given regarding a mode in which the image transmission program, the image distribution program, and the image display program are installed in advance in the ROM 54 or the storage 58; however, there is no limitation thereto. The programs may be provided in a format recorded on a recording medium such as Compact Disk Read Only Memory (CD-ROM), Digital Versatile Disk Read Only Memory (DVD-ROM), or Universal Serial Bus (USB) memory. Alternatively, these programs may be provided in a format downloaded from an external device through a network. Thus, the present disclosure may be embodied in a variety of embodiments.

What is claimed is:

1. A display device for a vehicle, comprising:
    a personal information acquisition section that receives personal information of a driver of the vehicle transmitted from a first identification tag at which the personal information of the driver is recorded, the personal information of the driver including at least a nationality of the driver indicating a language;
    an environment information acquisition section that acquires environment information about a vicinity of the vehicle;
    an information conversion section that converts the environment information in accordance with the personal information of the driver; and
    a display section that displays the converted environment information to the interior of a passenger compartment of the vehicle,
    wherein the environment information acquisition section includes an imaging device that acquires the environment information including a road sign,
    wherein the information conversion section converts the road sign to text information and another road sign that are comprehensible for the driver, the other road sign being separate and different from the text information.

2. The display device for a vehicle according to claim 1, wherein:
    the environment information acquisition section includes a communications device,
    the communications device acquires the environment information including traffic information, and
    the information conversion section converts the traffic information to text information.

3. The display device for a vehicle according to claim 2, wherein the communications device can transmit the traffic information to another vehicle.

4. The display device for a vehicle according to claim 1, wherein, when a vehicle occupant other than the driver is in the vehicle:
    the personal information acquisition section receives personal information of the vehicle occupant transmitted from a second identification tag at which the personal information of the vehicle occupant is recorded;
    the information conversion section converts the environment information in accordance with the personal information of the vehicle occupant; and
    the display section displays the information converted in accordance with the personal information of the vehicle occupant to the interior of the passenger compartment of the vehicle.

5. The display device for a vehicle according to claim 1, wherein the display device displays supplementary information relating to the environment information in accordance with the personal information of the driver.

6. A display device for a vehicle, comprising:
    a personal information acquisition section that acquires personal information of a driver of the vehicle from a first identification tag at which the personal information of the driver is recorded;

an environment information acquisition section that acquires environment information about a vicinity of the vehicle, the environment information including a road sign;

an information conversion section that converts the road sign to text information and another road sign in accordance with the personal information of the driver, the other road sign being separate and different from the text information;

a detection device that detects a position of the eyes of the driver; and a display section that displays the converted environment information to the interior of a passenger compartment of the vehicle based on the detected position of the eyes of the driver such that the other road sign overlaps the environment information.

7. The display device for a vehicle according to claim 6, wherein the personal information acquisition section receives the personal information of the driver of the vehicle which is transmitted from the first identification tag.

8. The display device for a vehicle according to claim 6, wherein the personal information of the driver includes at least a nationality of the driver indicating a language.

9. The display device for a vehicle according to claim 1, wherein the text information and the other road sign are displayed by the display section.

10. The display device for a vehicle according to claim 9, wherein the text information is positioned adjacent the other road sign.

11. The display device for a vehicle according to claim 9, wherein the text information includes translated text of text on the road sign, and the other road sign includes a converted image of an image of the road sign.

12. The display device for a vehicle according to claim 6, wherein the text information and the other road sign are displayed by the display section.

13. The display device for a vehicle according to claim 12, wherein the text information is positioned adjacent and spaced apart from the other road sign.

14. The display device for a vehicle according to claim 12, wherein the text information includes translated text of text on the road sign, and the other road sign includes a converted image of an image of the road sign.

* * * * *